United States Patent [19]
Park et al.

[11] Patent Number: 6,077,497
[45] Date of Patent: Jun. 20, 2000

[54] ZNS PHOTOCATALYST, PREPARATION THEREFOR AND METHOD FOR PRODUCING HYDROGEN BY USE OF THE SAME

[75] Inventors: Dae Chul Park; Sang Yoon Lim, both of Daejon, Rep. of Korea

[73] Assignees: Korea Research Institute of Chemical Technology, Daejon; Chunggu Co., Ltd., Daegu, both of Rep. of Korea

[21] Appl. No.: 09/269,789

[22] PCT Filed: Oct. 6, 1997

[86] PCT No.: PCT/KR97/00187

§ 371 Date: Apr. 1, 1999

§ 102(e) Date: Apr. 1, 1999

[87] PCT Pub. No.: WO98/15352

PCT Pub. Date: Apr. 16, 1998

[30] Foreign Application Priority Data

Oct. 7, 1996 [KR] Rep. of Korea ............... 96-44214

[51] Int. Cl.$^7$ .................. C01B 3/02; C01B 3/08; B01J 27/185; B01J 27/043; B01J 27/045; B01J 23/58; B01J 23/60; B01J 23/00; B01J 23/70; B01J 23/42; C09K 11/54

[52] U.S. Cl. ............ 423/648.1; 423/657; 502/213; 502/222; 502/223; 502/328; 502/329; 502/337; 502/338; 502/339; 252/301.65

[58] Field of Search ................... 423/648.1, 657; 502/213, 222, 328, 329, 337, 338, 339, 323; 252/301.65; 204/157.44, 157.52, 903, 908, 910

[56] References Cited

PUBLICATIONS

Accession No. 87–124981/18, Translation of Abstract of JP62065743 A.
Accession No. 84–198079/32, Translation of Abstract of JP59112841 A.
Accession No. 96–054213/06, Translation of Abstract of JP07313884 A.

*Primary Examiner*—Steven P. Griffin
*Assistant Examiner*—Maribel Medina
*Attorney, Agent, or Firm*—Jacobson, Price, Holman & Stern, PLLC

[57] ABSTRACT

A photocatalyst, represented by Formula II $$Pt(a)/Zn[M(b)]S \qquad II$$

wherein character "a" represents a percentage by weight of Pt in the photocatalyst, ranging from 0.1 to 3.5; character "M" is an element selected from the group consisting of Co, Fe, Ni and P; character "b" represents a mole % of M/Zn, ranging from 0.05 to 30. It can be active in the range of the visible light, live a semi-permanent life and produce hydrogen at a high yield without using any oxygen-containing organic compound as a hydrogen-producing promotor.

8 Claims, No Drawings

ZNS PHOTOCATALYST, PREPARATION THEREFOR AND METHOD FOR PRODUCING HYDROGEN BY USE OF THE SAME

This application is a 371 of PCT/KR97/00187 filed on Oct. 6, 1987, now WO 98/15352.

TECHNICAL FIELD

The present invention relates, in general, to a novel photocatalyst and, more particularly, to a photoreaction in which hydrogen can be efficiently and economically produced from water in the presence of a photocatalyst. Also, the present invention is concerned with a method for preparing the photocatalyst and a method for producing hydrogen.

BACKGROUND ART

Hydrogen is a very important material in the chemical industry. For example, it is used to produce ammonia and to synthesize hydrogen chloride. Also, it is an essential material for the hydrogenation in which unsaturated compounds are converted into saturated ones. In addition, hydrogen plays a pivotal role in improving the quality of petroleum products, that is, in the hydrotreating processes including hydrogen addition, desulfurization, denitrogenation and demetallization. Another example of the use of hydrogen is the contact hydrogenation of carbon dioxide in which carbon dioxide, which causes global warming, is reclaimed, immobilized and reused. In addition, hydrogen is viewed as a pollution-free, clear energy source substituting for existing fossil fuels.

Conventional techniques for obtaining hydrogen include extraction from fossil fuels, such as naphtha, modification of natural gas, reaction of vapor with iron, reaction of water with metal, electrolysis of water and etc. These techniques are economically unfavorable because immense heat or electric energy is required. The conventional techniques have another disadvantage of generating a large quantity of by-products, carbon dioxide or oxygen (upon electrolysis). As mentioned above, carbon dioxide is a serious air pollutant causing the greenhouse effect of the globe. When oxygen is generated, the hydrogen is difficult to separate from the oxygen, owing to which the process becomes complicated. Anyway, such by-products could make it difficult to obtain high purity hydrogen in high yields. Since the hydrogen production using such conventional techniques is usually carried out at relatively high temperatures, most of the related equipments, e.g. reactors and purifying apparatuses, are designed to be resistant to heat and thus, they are very expensive, which is an economically unfavorable factor.

Hydrogen gas can readily escape from the gravity of the earth because it is of low specific gravity and most of it exists in water or inorganic forms. For these reasons, only a small quantity of hydrogen exists in the atmosphere. Therefore, the development of the techniques whereby high purity hydrogen can be efficiently obtained from water is very important in that the urgent problem of exploiting substitute energy sources can be solved and the material for chemical industry can be secured.

Recently hydrogen producing techniques have been developed in which a photocatalyst is used to decompose water into hydrogen and oxygen. However, the prior arts relating to the photocatalyst for producing hydrogen are few published, representatives of which are exemplified by Japanese Pat. Laid-Open Publication Nos. Sho. 62-191045 and Sho. 63-107815.

Japanese Pat. Laid-Open Publication No. Sho. 62-191045 discloses that hydrogen is generated from an aqueous $Na_2S$ solution in the presence of a rare-earth element compound by a photolysis reaction. The rare-earth element compound has an advantage of exhibiting an optical catalytic activity in the range of the visible light.

Japanese Pat. Laid-Open Publication No. Sho. 63-107815 describes a photolysis reaction in which a composite oxide of niobium and alkali earth metal is used as a photocatalyst, to generate hydrogen from a methanol solution in water. Likely, this photocatalyst has an advantage of being active in the range of the visible light.

However, these above prior arts are disadvantageous in that the amount of the hydrogen generated is very small.

Korean Pat. Appl'n. No. 95-7721, under the present inventor, which is believed to solve the above problems to some degree, suggests a photocatalyst represented by the following general formula I:

$$Cs(a)/K_4Nb_6O_{17} \qquad \text{I}$$

In the presence of the photocatalyst, ultraviolet light is irradiated onto an aqueous solution mixed with oxygen-containing organic compounds, such as formaldehyde and alcohol, acting as a hydrogen-generating promoter, to produce hydrogen.

This technique little affects the environment and can generate hydrogen at low temperatures, e.g. room temperature. However, the oxygen-containing organic compound as a hydrogen-generating promotor, makes it impossible to reuse the reactants.

DISCLOSURE OF THE INVENTION

Therefore, it is an object of the present invention to overcome the above problems encountered in prior arts and to provide a novel photocatalyst for producing hydrogen, which is active in the range of the visible light and with which a large quantity of hydrogen is efficiently produced at low temperatures, e.g. room temperature, without using any oxygen-containing organic compound.

It is another object of the present invention to provide a method for preparing the photocatalyst.

It is a further object of the present invention to provide a method for economically producing hydrogen using the photocatalyst.

In accordance with an aspect of the present invention, there is provided a photocatalyst represented by the following general formula II:

$$Pt(a)/Zn[M(b)]S \qquad \text{II}$$

wherein character "a" represents a percentage by weight of Pt in the photocatalyst, ranging from 0.1 to 3.5; character "M" is an element selected from the group consisting of Co, Fe, Ni and P; character "b" represents a mole % of M/Zn, ranging from 0.05 to 30.

In accordance with another aspect of the present invention, there is provided a method for preparing a photocatalyst, comprising the steps of: dissolving Zn-containing and M-containing compounds in water in such a way that M/Zn ranges, in mole %, from 0.05 to 30; adding $H_2S$ or $Na_2S$ as a reactant in the solution with stirring to precipitate Zn[M]S; washing the precipitate with water until pH reaches 7 and drying the precipitate; sintering it at 250–350° C. for 1–3 hours; etching it with acid; washing it with water until the pH reaches 7; and drying and sintering it.

In accordance with a further aspect of the present invention, there is provided a method for producing hydrogen, in which ultraviolet or visible light is irradiated onto a suspension of the photocatalyst in water which is added with $Na_2S$ as an electron donor and $NaH_2PO_2$ as a reducing agent.

BEST MODE FOR CARRYING OUT THE INVENTION

Acting as a promotor, the M ingredient in the photocatalyst of the present invention is an element selected from the group consisting of Co, Fe, Ni and P, and used preferably at such an amount that the mole % of M/Zn ranges approximately 0.05 to 30. For example, if too little M ingredient is used, the $Zn_{2+}$ ion in the photocatalyst is reduced to dark gray Zn, losing the catalytic activity. On the other hand, if too much M ingredient is used, the photocatalyst is seriously reduced in the capability of generating hydrogen.

In the photocatalyst of the present invention, Pt serves as an electron acceptor and is preferably used at an amount of 0.1–3.5% by weight. For example, when the amount of Pt is less than the lower limit, the photocatalyst becomes poor in the production rate of hydrogen as well as lives a short life. On the other hand, if the amount of Pt is over the upper limit, the generation amount of hydrogen cannot increase further and it is economically unfavorable owing to the increased production cost of the catalyst.

As to the amount of zinc and sulfur, it is preferred that the molar ratio of zinc to sulfur ranges from 1:0.1 to 1:2.8 and more preferably from 1:0.6 to 1:1.4. For example, if the molar ratio departs from the ranges, the efficacy of the photocatalyst profoundly becomes poor.

Examples of the Zn-containing compounds include $ZnSo_4.7H_2O$ and $Zn(NO_3)_2.6H_2O$ while the M-containing compound can be obtained from, for example, $Co(NO_3)_2 6H_2O$, $NiCl_2.6H_2O$, $Fe(NO_3)_2.9H_2O$, $H_3PO_2$ and $H_3PO_4$. In the preparation method of the photocatalyst of the invention, the drying and the sintering steps after the control of pH to 7 have an aim of removing the above acidic metal salt solution remaining in the precipitate or other residual acidic solutions.

The etching with acid after the primary sintering is taken in order to remove the oxides which may be formed on the surface of Zn[M]S. Examples of available acid include nitric acid, hydrochloric acid and sulfuric acid with the most preference to nitric acid when considering the convenience of treatment.

Preferably, Zn[M]S is impregnated with Pt by dissolving hydrogen hexachloroplatinate ($H_2PtCl_6$) in water, adding Zn[M]S in the water and illuminating ultra violet light on the water. The Pt-impregnated Zn[M]S thus obtained is washed with water until its pH reaches 7, dried at 100–120° C. and sintered to yield the photocatalyst of the invention. Upon sintering, the temperature is preferably in a range of 250–350° C. For example, if the sintering step is carried out at a temperature lower than the range, the resulting photocatalyst has a short life span. On the other hand, if a too much higher temperature is taken, the resulting photocatalyst is poor in the production rate of hydrogen.

In order to produce hydrogen, for example, 0.15–0.40 moles of $Na_2$ as an electron donor and 0.2–0.5 moles of $NaH_2PO_2$ are first dissolved in water and added with the photocatalyst of the present invention. Then, this suspension is irradiated by visible or uv light with stirring. When $Na_2S$ and $NaH_2PO_2$ are used at an amount smaller than 0.15 moles and 0.40 moles, respectively, the production rate of hydrogen is reduced. On the other hand, when the amounts of $Na_2S$ and $NaH_2PO_2$ exceed their individual upper limits, the production rate of hydrogen cannot be increased further.

The production of hydrogen using the photocatalyst of the present invention is preferably obtained at a temperature of 10–60° C. in a vacuum or under up to 2 atm.

A better understanding of the present invention may be obtained through the following examples which are set forth to illustrate, but are not to be construed as the limit of the present invention.

PREPARATION EXAMPLE I

In 500 ml, 143.77 g of $ZnSO_4.7H_2O$ and 0.29 g of $Co(NO_3)_2.6H_2O$ were added to give a 0.2 mole % Co/Zn suspension. The suspension was added with $H_2S$ as a reactant and stirred to obtain precipitates which were, then, washed with water until its pH reached 7, dried at 110° C. for 12 hours, sintered at 300° C. for 2 hours and etched with nitric acid for 1 hour. The resulting etched, sintered body was again washed with water until the pH reached 7, followed by drying in vacuo at 60° C., to produce ZnCOS powder.

To the powder, hydrogen hexachloroplatinate ($H_2PtCl_6$) was added and irradiated with uv light for 30 min to impregnate the carrier with 2% by weight of Pt. The Pt/ZnCoS powder thus obtained was again washed with water until the pH reached 7, dried at 110° C. for 12 hours, oxidation-sintered at 300° C. for 2 hours and then, reduction-sintered at 300° C. for 2 hours, to yield a final Pt/ZnCoS photocatalyst.

PREPARATION EXAMPLES II AND III

The procedure of Preparation Example I was repeated using such controlled amounts of $Co(NO_3)_2.6H_2O$ that Co/Zn was 0.6 and 1.0 in mole %, respectively.

PREPARATION EXAMPLES IV TO VI

The procedure of Preparation Example I was repeated except that $Fe(NO_3)_2.9H_2O$, $NiCl_2.6H_2O$ and $H_3PO_2$, instead of $Co(NO_3)_2.6H_2O$, were used at such an amount that Fe/Zn, Ni/Zn and P/Zn were 5.0 in mole %, respectively.

EXAMPLES I TO VI 0.5 g of the photocatalysts obtained in Preparation Examples I to VI were suspended in 500 ml of water which contained 0.24 M of $Na_2S$ and 0.35 M of $NaH_2PO_2$ and stirred at a speed of 400 rpm in a photoreactor of a closed air circulation system. Using a high pressure mercury lamp to illuminate visible light upon the suspension, hydrogen was produced at room temperature under one atmosphere. The amounts of the produced hydrogen were analyzed by gas chromatography and the results are given as shown in Table 1 below.

Comparative Example I

Hydrogen was produced in a similar manner to that of Example I except that the photocatalyst used was prepared in such a way that Co/Zn was contained at an amount of 0.04 mole %. The result is given as shown in Table 1 below.

Comparative Examples II TO V

Hydrogen was produced in a similar manner to that of Example I except that the photocatalyst used was prepared in such a way that Co/Zn, Fe/Zn, Ni/Zn and P/Zn were contained at an amount of 40 mole %, each. The results are given as shown in Table 1 below.

EXAMPLE VII

The procedure was repeated using uv light and the result is given as shown in Table 1 below.

EXAMPLE VIII

The procedure was repeated using $Na_2S$ at a concentration of 0.15 M and the result is given as shown in Table 1 below.2

Comparative Example VI

The procedure was repeated using $Na_2S$ at a concentration of 0.15 M and the result is given as shown in Table 1 below.

EXAMPLE IX

The procedure was repeated using $Na_2S$ at a concentration of 0.4 M and the result is given as shown in Table 1 below.

Comparative Example VII

The procedure was repeated using $Na_2S$ at a concentration of 0.5 M and the result is given as shown in Table 1 below.

EXAMPLE X

The procedure was repeated using $NaH_2PO_2$ at a concentration of 0.2 M and the result is given as shown in Table 1 below.

Comparative Example VIII

The procedure was repeated using $NaH_2PO_2$ at a concentration of 0.15 M and the result is given as shown in Table 1 below.

EXAMPLE XI

The procedure was repeated using $NaH_2PO_2$ at a concentration of 0.15 M and the result is given as shown in Table 1 below.

Comparative Example IX

The procedure was repeated using $NaH_2PO_2$ at a concentration of 0.55 M and the result is given as shown in Table 1 below.

TABLE 1

| Exam. No. | Catalyst | Light | Amount of Gas (ml/0.5 g hr) |
|---|---|---|---|
| I | Pt (2 wt. %)/Zn [Co (0.2)]S | visible | 600 |
| II | Pt (2 wt. %)/Zn [Co (0.6)]S | visible | 474 |
| III | Pt (2 wt. %)/Zn [Co (1.0)]S | visible | 320 |
| IV | Pt (2 wt. %)/Zn [Fe (5.0)]S | visible | 848 |
| V | Pt (2 wt. %)/Zn [Ni (5.0)]S | visible | 919 |
| VI | Pt (2 wt. %)/Zn [P (5.0)]S | visible | 421 |
| C. I | Pt (2 wt. %)/Zn [Co (0.04)]S | visible | 78* |
| C. II | Pt (2 wt. %)/Zn [Co (40)]S | visible | 280 |
| C. III | Pt (2 wt. %)/Zn [Fe (40)]S | visible | 220 |
| C. IV | Pt (2 wt. %)/Zn [Ni (40)]S | visible | 206 |
| C. V | Pt (2 wt. %)/Zn [P (40)]S | visible | 891 |
| VII | Pt (2 wt. %)/Zn [Co (0.2)]S | visible | 520 |
| VIII | Pt (2 wt. %)/Zn [Co (0.2)]S | visible | 423 |
| C. VI | Pt (2 wt. %)/Zn [Co (0.2)]S | visible | 620 |
| IX | Pt (2 wt. %)/Zn [Co (0.2)]S | visible | 625 |
| C. VII | Pt (2 wt. %)/Zn [Co (0.2)]S | visible | 510 |
| X | Pt (2 wt. %)/Zn [Co (0.2)]S | visible | 433 |

TABLE 1-continued

| Exam. No. | Catalyst | Light | Amount of Gas (ml/0.5 g hr) |
|---|---|---|---|
| C. VIII | Pt (2 wt. %)/Zn [Co (0.2)]S | visible | 629 |
| XI | Pt (2 wt. %)/Zn [Co (0.2)]S | visible | 633 |
| C. IX | Pt (2 wt. %)/Zn [Co (0.2)]S | visible | 600 |

*the catalytic activity lost in 30 min owing to the reduction of $Zn^{2+}$ to Zn.

Industrial Applicability

As apparent from the data, the photocatalysts in accordance with the present invention are superior in production rate and life span as well as show activity in the range of the visible light.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A ZnS photocatalyst for the production of hydrogen, represented by the following general formula II:

$$Pt(a)/Zn[M(b)]S \qquad II$$

wherein character "a" represents a percentage by weight of Pt in the photocatalyst, ranging from 0.1 to 3.5; character "M" is an element selected from the group consisting of Co, Fe, Ni and P; character "b" represents a mole % of M/Zn, ranging from 0.05 to 30.

2. A ZnS photocatalyst in accordance with claim 1, wherein said b ranges from 0.1 to 2.8.

3. A method for preparing a photocatalyst, comprising the steps of: dissolving Zn-containing and M-containing compounds (wherein M is selected from the group consisting of Co, Ni, Fe, and P) in water in such a way that M/Zn ranges, in mole %, from 0.05 to 30; adding $H_2S$ or $Na_2S$ as a reactant in the solution with stirring to precipitate Zn[M]S; washing the precipitate with water until its pH reaches 7 and drying the precipitate; first sintering it at 250–350° C. for 1–3 hours; etching it with acid; washing it with water until the pH reaches 7 and drying it; adding a liquid Pt-containing compound to the Zn[M]S and impregnating Pt in the Zn[M]S at an amount of about 0.1–3.5%, by weight by illumination with uv light; washing the Pt-impregnated Zn[M]S until its pH reaches 7 and subjecting it to drying and second sintering.

4. A method in accordance with claim 3, wherein said M-containing compound is selected from the group consisting of $Co(NO_3)_2 \cdot 6H_2O$, $NiCl_2 \cdot 6H_2O$, $Fe(NO_3)_2 \cdot 9H_2O$, $H_3PO_2$ and $H_3PO_4$.

5. A method in accordance with claim 3, wherein said first sintering step comprises a sequence of oxidation sintering and reduction sintering.

6. A method in accordance with claim 3, wherein said Zn-containing compound is selected from the group consisting of $ZnSO_4 \cdot 7H_2O$ and $Zn(NO_3)_2 \cdot 6H_2O$.

7. A method for producing hydrogen, in which ultraviolet or visible light is irradiated onto a suspension of a photocatalyst in water which is added 0.15–0.40 moles of $Na_2S$ as an electron donor and 0.2–0.5 moles of $NaH_2PO_2$ as a reducing agent, wherein the photocatalyst is represented by the following general formula II:

$$Pt(a)/Zn[M(b)]S \qquad II$$

wherein character "a" represents a percentage by weight of Pt in the photocatalyst, ranging from 0.1 to 3.5; character "M" is an element selected from the group consisting of Co, Fe, Ni, and P; character "b" represents a mole % of M/Zn, ranging from 0.05 to 30.

8. A method in accordance with claim 7, wherein hydrogen is produced at a temperature of 10–60° C. in a vacuum or under up to 2 atm.

* * * * *